United States Patent
Harleman et al.

(10) Patent No.: US 11,451,034 B2
(45) Date of Patent: Sep. 20, 2022

(54) RACEWAY SYSTEMS AND METHODS FOR ROUTING TRANSFERRING COMPONENTS WITHIN AN INTERIOR CABIN OF AN AIRCRAFT

(71) Applicant: THE BOEING COMPANY, Chicago, IL (US)

(72) Inventors: Thomas J. Harleman, Maple Valley, WA (US); Nicholas J. Foti, Maple Valley, WA (US); Christopher M. Lombardi, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 719 days.

(21) Appl. No.: 16/426,556

(22) Filed: May 30, 2019

(65) Prior Publication Data

US 2020/0381911 A1    Dec. 3, 2020

(51) Int. Cl.
| | | |
|---|---|---|
| *H02G 3/20* | (2006.01) | |
| *H02G 3/00* | (2006.01) | |
| *B64D 47/00* | (2006.01) | |
| *H02G 1/06* | (2006.01) | |
| *H02G 3/04* | (2006.01) | |

(52) U.S. Cl.
CPC ............. *H02G 3/263* (2013.01); *B64D 47/00* (2013.01); *H02G 1/06* (2013.01); *H02G 3/0406* (2013.01); *H02G 3/0437* (2013.01); *H02G 3/0456* (2013.01); *B64D 2221/00* (2013.01)

(58) Field of Classification Search
USPC .............................................. 244/119, 37, 60
See application file for complete search history.

(56) References Cited

U.S. PATENT DOCUMENTS

| | | | |
|---|---|---|---|
| 4,437,627 A | 3/1984 | Moorehead | |
| 4,490,883 A | 1/1985 | Gauron | |
| 5,083,727 A | 1/1992 | Pompei | |
| 7,083,144 B2 | 8/2006 | Howe | |
| 7,727,452 B2 | 6/2010 | Blandin | |
| 8,382,034 B2 * | 2/2013 | Beentjes | B64D 11/00 244/118.1 |
| 8,597,560 B2 | 12/2013 | Paspirgills | |
| 8,684,358 B2 | 4/2014 | Stewart | |
| 9,494,185 B2 | 11/2016 | Zuardy | |
| 9,650,126 B2 | 5/2017 | Blanchard | |
| 10,640,156 B2 | 5/2020 | Bolvin | |

(Continued)

OTHER PUBLICATIONS

Extended European Search Report for EP 20177350.4-1010, dated Oct. 28, 2020.

*Primary Examiner* — Krystal Robinson
(74) *Attorney, Agent, or Firm* — The Small Patent Law Group LLC; Joseph M. Butscher

(57) ABSTRACT

A raceway system and method within an internal cabin of an aircraft include a plurality of routing modules that are coupled together. Each of the plurality of routing modules includes a main housing that routes one or more transferring components to one or more monuments within the internal cabin. A raceway system and method for an aircraft includes a transferring component attachment system that includes a plurality of transferring component support struts, and one or more transferring components coupled to the plurality of transferring component support struts.

20 Claims, 8 Drawing Sheets

(56) References Cited

U.S. PATENT DOCUMENTS

| | | | |
|---|---|---|---|
| 2006/0237585 A1* | 10/2006 | Lau | B64D 11/003 244/118.5 |
| 2017/0057612 A1* | 3/2017 | King | B64C 1/066 |
| 2018/0002020 A1 | 1/2018 | Tablepour | |
| 2020/0040925 A1 | 2/2020 | Mancina | |

* cited by examiner

RACEWAY SYSTEMS AND METHODS FOR ROUTING TRANSFERRING COMPONENTS WITHIN AN INTERIOR CABIN OF AN AIRCRAFT

FIELD OF THE DISCLOSURE

Embodiments of the present disclosure generally relate to raceway systems and methods for routing transferring components (such as electrical wiring, ducting, liquid conduits, and/or the like) within an interior cabin of an aircraft.

BACKGROUND OF THE DISCLOSURE

Certain military commercial derivate aircraft (MCDA) such as airborne warning and control system (AWACS), joint surveillance and target attack radar system (JSTARS), P-8 Maritime Patrol Aircraft, KC-46 Tanker, and the like are manufactured based on commercial airframes. Such MCDA include various systems, sub-systems, and transferring components (that is, components that transfer an electrical signal or fluid such as air or liquid) beyond that which are typically found in commercial aircraft. For example, during a manufacturing process of a military commercial derivate aircraft, mission system wiring, environmental cooling ducts, aerial refueling tubes, liquid cooling lines, and the like are secured to various portions of a fuselage, for example.

As can be appreciated, engineering effort associated with the design of compliant installations for the various systems within the aircraft is rigorous as a result of multiple routing paths to meet requirements and avoid existing systems and structures. Each new routing path increases both the engineering design effort and manufacturing factory labor hours associated with installing structural support provisions at primary structures. The design considerations for installation of various military systems, sub-systems, and transferring components within a commercial airframe is unique for each aircraft and typically requires substantial engineering effort to define routing paths around existing commercial systems, and generate associated installation, assembly, and detail drawings for all required support provisions. Moreover, the manufacturing effort is also labor intensive in that individuals typically individually secure each transferring component to frames via support provisions and fasteners, for example.

In general, a fuselage of an aircraft includes numerous frames coupled to stringers that extend along a length of the fuselage. In order to securely mount transferring components (such as wiring, air ducts, liquid conduits, and the like) within an internal cabin formed by the fuselage, the transferring components are secured to portions of the frames and the stringers with fasteners, such as clips. As such, complex engineering is needed to determine thousands of attachment points. After the transferring components are secured to the frames and stringers, wall structures may be secured over the frames and stringers. That is, the transferring components are secured to frames and stringers that form sidewall portions, ceilings, and the like within the internal cabin. When sidewalls and other interior finishing components are installed, they cover up various transferring components, thereby reducing access to such transferring components. Accordingly, gaining access to such transferring components for maintenance, replacement, and the like may be time and labor intensive, as well as expensive.

SUMMARY OF THE DISCLOSURE

A need exists for a system and a method for efficiently mounting transferring components (such as electrical wiring, ducting, liquid conduits, and/or the like) within an internal cabin of an aircraft, such as a military commercial derivative aircraft. Further, a need exists for a system and a method that reduce the time, effort, and cost of securing transferring components within an internal cabin of an aircraft, and reduce a total manufacturing time. Further, a need exists for a system and method of efficiently modifying current routing systems. Additionally, due to certain regulations (such as United States Federal Aviation Administration Electrical Wiring Interconnect System regulations), a need exists for systems and methods that allow for easy and cost-efficient inspection of installed wiring.

With those needs in mind, certain embodiments of the present disclosure provide a raceway system within an internal cabin of an aircraft. The raceway system includes a plurality of routing modules that are coupled together. Each of the plurality of routing modules includes a main housing that routes one or more transferring components to one or more monuments within the internal cabin.

In at least one embodiment, the main housing includes a bottom opening. Portions of the one or more transferring components extend through the bottom opening to couple to the monument(s).

At least one of the plurality of modules may include a door that is pivotally coupled to the main housing proximate to the bottom opening. The door is configured to be selectively moved between an open position and a closed position.

In at least one embodiment, at least one fixed panel extends between at least one of the plurality of modules and the monument(s).

The plurality of routing modules are outside of a sidewall and ceiling of the internal cabin. At least one of the plurality of routing modules is positioned above the monument(s).

In at least one embodiment, each of the plurality of routing modules is secured to one or both of at least one frame or at least one stringer by one or more stowage bin mounting supports.

In at least one embodiment, one or more of the plurality of routing modules comprises a longitudinal separating wall that defines a first space and a second space. The first space and the second space allow different transferring components to be separated from one another, such as may be required by aircraft design practices and regulations.

In at least one embodiment, each of the plurality of routing modules includes one or more transferring component support struts that secure the transferring component(s) within the main housing. The transferring component strut(s) are secured to one or more lugs within the main housing through one or more fasteners. The transferring component(s) may be secured to the transferring component support strut(s) before being secured within the main housing.

At least one of the plurality of routing modules may include a top opening formed through a top wall.

Certain embodiments of the present disclosure provide a raceway method for an internal cabin and/or lower lobes (such as underneath a floor) of an aircraft. The raceway method includes providing a plurality of routing modules, coupling the plurality of routing modules together within the internal cabin, and routing one or more transferring components to one or more structures (such as monuments) within the internal cabin through main housings of the plurality of routing modules.

In at least one embodiment, the raceway method includes extending portions of the one or more transferring components through bottom openings of the main housings, and disposing the plurality of routing modules outside of a sidewall and ceiling of the internal cabin.

In at least one embodiment, the raceway method includes positioning at least one of the plurality of routing modules above the one or more monuments.

In at least one embodiment, the raceway method also includes securing each of the plurality of routing modules to one or both of at least one frame or at least one stringer with one or more existing stowage bin mounting supports.

In at least one embodiment, the providing includes providing the one or more of the plurality of routing modules with a longitudinal separating wall that defines a first space and a second space. The first space and the second space allow different transferring components to be separated from one another.

In at least one embodiment, the raceway method includes securing the one or more transferring components to one or more transferring component struts, and securing the one or more transferring component struts that are coupled to the one or more transferring components to one or more lugs within the main housings.

The providing may also include forming a top opening through a top wall of at least one of the plurality of routing modules.

Certain embodiments of the present disclosure provide an aircraft including a fuselage defining an internal cabin. The fuselage includes a plurality of frames and a plurality of stringers connected to the plurality of frames. One or more monuments are within the internal cabin. A raceway system is within the internal cabin. The raceway system includes a plurality of routing modules that are coupled together, as described herein.

Certain embodiments of the present disclosure provide a raceway system for an aircraft. The raceway system includes a transferring component attachment system that includes a plurality of transferring component support struts, and one or more transferring components coupled to the plurality of transferring component support struts.

In at least one embodiment, each of the plurality of transferring component support struts includes a main beam having ends that are configured to couple to securing lugs of a main housing of a routing module. For example, each of the ends may include prongs separated by a space.

The transferring component(s) are coupled to one or more of top surfaces, bottom surfaces, or through the plurality of transferring component support struts. As an example, a first transferring component is coupled to top surfaces of the plurality of transferring component support struts, and a second transferring component is coupled to bottom surfaces of the plurality of transferring component support struts.

In at least one embodiment, each of the plurality of transferring component support struts includes one or more securing clips that retains one or more portions of the transferring component(s).

In at least one embodiment, the plurality of transferring component support struts and the transferring component(s) are wound onto a drum reel.

In at least one embodiment, the raceway system also includes a plurality of routing modules that are coupled together. The transferring component attachment system is coupled to the plurality of routing modules. The plurality of routing modules include main housings that are configured to route the one or more transferring components to one or more monuments within the aircraft. In at least one embodiment, the plurality of routing modules are outside of a sidewall and ceiling of an internal cabin of the aircraft. Each of the plurality of routing modules may be secured to one or both of at least one frame or at least one stringer by one or more stowage bin mounting supports.

Certain embodiments of the present disclosure provide a raceway method for an aircraft. The raceway method includes forming a transferring component attachment system. The forming the transferring component attachment system includes providing a plurality of transferring component support struts, and coupling one or more transferring components to the plurality of transferring component support struts.

In at least one embodiment, the coupling includes coupling the transferring component(s) to one or more of top surfaces, bottom surfaces, or through the plurality of transferring component support struts. For example, the coupling includes coupling a first transferring component to top surfaces of the plurality of transferring component support struts, and coupling a second transferring component to bottom surfaces of the plurality of transferring component support struts.

The raceway method may include retaining one or more portions of the transferring component(s) by one or more securing clips of the plurality of transferring component support struts.

The raceway method may include winding the transferring component system onto a drum reel.

In at least one embodiment, the raceway method includes coupling a plurality of routing modules that together, and coupling the transferring component attachment system to the plurality of routing modules. The raceway method may include disposing the plurality of routing modules outside of a sidewall and ceiling of an internal cabin of the aircraft. The raceway method may include securing each of the plurality of routing modules to one or both of at least one frame or at least one stringer by one or more stowage bin mounting supports.

Certain embodiments of the present disclosure provide a raceway method for an aircraft. The raceway method includes coupling one or more transferring components to a plurality of support struts to form a transferring component attachment system, winding the transferring component attachment system onto a drum reel, unrolling the transferring component attachment system off of the drum reel, and securing the transferring component attachment system to a plurality of routing modules within the aircraft.

DETAILED DESCRIPTION OF THE DISCLOSURE

Figure 1:
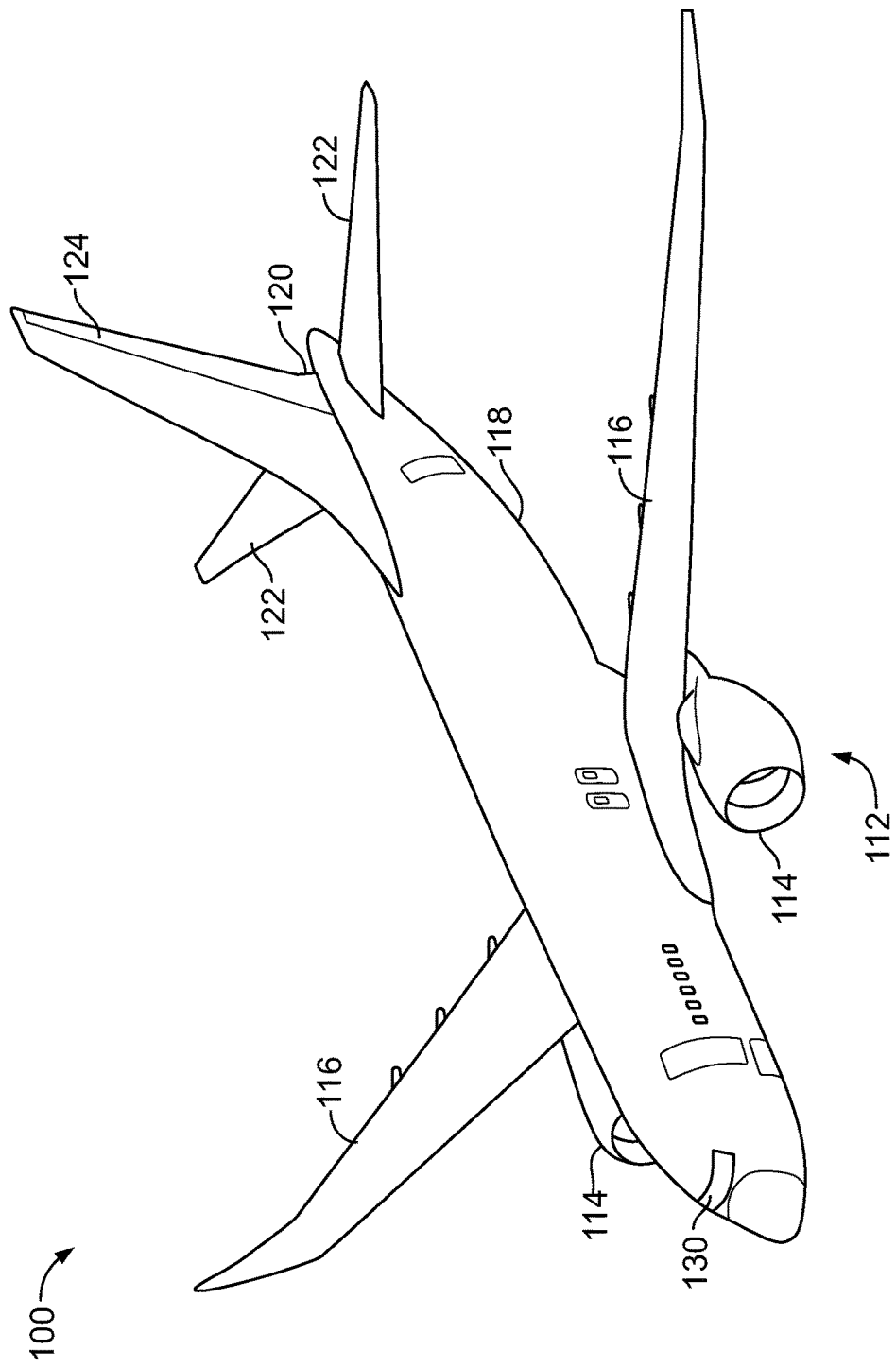
FIG. 1 illustrates a perspective top view of an aircraft, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide a raceway system for routing transferring components within an interior cabin of an aircraft. Transferring components transfer signals or fluid between different systems, structures, or the like. For example, an electrical wire is a component that transfers electrical signals. An air duct is a component that transfers a fluid, such as air. A liquid conduit is a component that transfers a fluid, such as water or fuel.

In at least one embodiment, the raceway system includes a plurality of routing modules that couple together. The raceway system provides flexible and scalable installation of transferring components within the interior cabin. The routing modules provide defined, simple pathways for component routing and support. In at least one embodiment, each routing module is configured to attach to existing commercial aircraft stowage bin support mounting couplers, thereby reducing manufacturing time and effort due to a reduction in modifications to the airframe. The design hours and manufacturing installation time for support provisions and transport element installations is greatly reduced, correlating to lower non-recurring engineering and recurring factory labor costs.

Embodiments of the present disclosure provide raceway systems and methods that allow convenient access to mission system wiring to accommodate certain electrical wiring interconnect system (EWIS) inspections throughout the life of an aircraft. The raceway systems and methods result in lower engineering costs resulting from a pre-defined subsystem transport element routing volume and lower factory labor costs due to less time installing the transport elements and supports. The raceway systems and methods greatly reduce the number of support provisions, such as brackets and clamps, which are designed and installed to primary structure on each modified aircraft. In at least one embodiment, the routing modules attach to existing stowage bin mounting provisions, such as via bolts, pins, and tie-rods. The raceway systems and methods reduce engineering development time by allowing for a greater emphasis on subsystem routing within a large, reserved volume containing defined pathways to reduce the engineering effort associated with routing installations from one point to another on the aircraft.

In at least one embodiment, the raceway systems also segregate mission system transferring components, such as within the routing modules for a military commercial derivative aircraft from the type certified aircraft. By segregating the mission system transferring components in the module, there is clear demarcation between certified aircraft systems and mission system transferring components, for example. The routing modules provide defined space allocations for mechanical subsystems such as ducts and tubes as well as for different wire type based on categorization such as classified, fiber-optic, coax, or power wiring. Wire separation and location within the volume of the routing modules may be predefined and consistent across a length of the raceway system to simplify wire routing design.

In at least one embodiment, installation of prefabricated and tested wire-groups is expedited through the use of a drum to roll out the assembled wire-group and pin it in place in the raceway system, thereby greatly reducing one of the most labor-intensive manufacturing jobs during a traditional modification and installation program.

FIG. 1 illustrates a perspective top view of an aircraft 100, according to an embodiment of the present disclosure. In at least one embodiment, the aircraft 100 is a military commercial derivate aircraft. In at least one other embodiment, the aircraft 100 is a commercial aircraft. The aircraft 100 includes a propulsion system 112 that includes two turbofan engines 114, for example. Optionally, the propulsion system 112 may include more engines 114 than shown. The engines 114 are carried by wings 116 of the aircraft 100. In other embodiments, the engines 114 may be carried by a fuselage 118 and/or an empennage 120. The empennage 120 may also support horizontal stabilizers 122 and a vertical stabilizer 124. The fuselage 118 of the aircraft 100 defines an internal cabin 130, which includes a cockpit. The aircraft 100 may be sized, shaped, and configured other than shown in FIG. 1. For example, the aircraft 100 may be a non-fixed wing aircraft.

Figure 2:
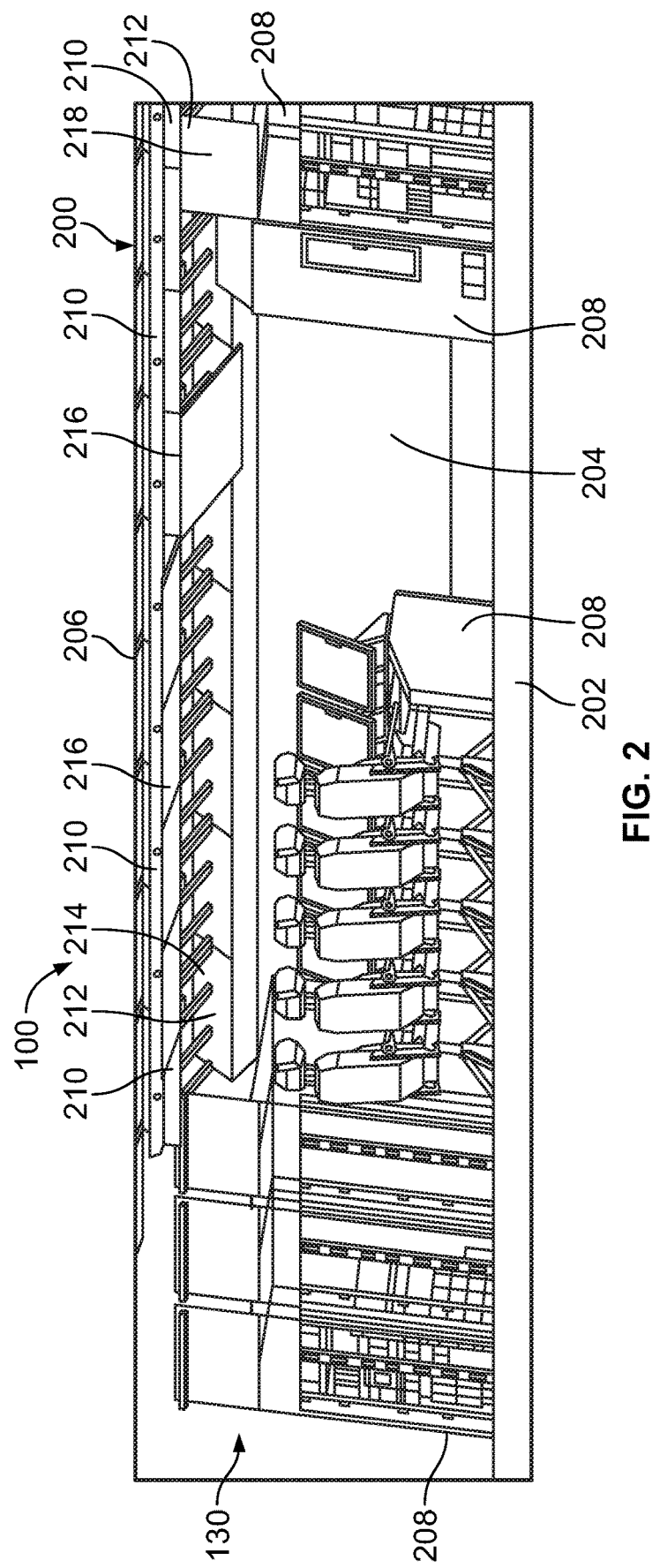
FIG. 2 illustrates a perspective view of a raceway system within an internal cabin of the aircraft, according to embodiment of the present disclosure.

FIG. 2 illustrates a perspective view of a raceway system 200 within the internal cabin 130 of the aircraft 100, according to embodiment of the present disclosure. The internal cabin 130 includes a floor 202, a sidewall 204, and a ceiling 206. Various systems and monuments 208 (such as cabinets, consoles, computer workstations, and the like) are supported on the floor 202, underneath the floor 202, suspended over the floor 202, and/or the like. The internal cabin 130 refers to all internal portions of an aircraft that are within a space defined by a fuselage for example. For example, the internal cabin 130 includes space within the aircraft for individuals, as well as lower lobes, cargo areas, and/or the like.

In at least one embodiment, the raceway system 200 includes a plurality of routing modules 210. Each routing module 210 includes a main housing 212. The main housing 212 includes a bottom opening 214. A door 216 may pivotally couple to the main housing 212 proximate to the bottom opening 214, and is configured to be selectively moved between open and closed positions. In the open position, the bottom opening 214 is exposed and open. In the closed position, the bottom opening 214 is closed. As another option, a fixed panel 218 may extend between a main housing 212 and a monument 208.

As shown, the raceway system 200 is outside of the sidewall 204 and the ceiling 206. The raceway system 200 is configured to route transferring components to the monuments 208. Because the raceway system 200 is above the monuments 208 and not within the sidewall 204 or the ceiling 206, the transferring components routed through the raceway system 200 may be easily accessed without moving the monuments 208 and/or portions of the sidewall 204 in order to gain access to transport elements.

Figure 3:
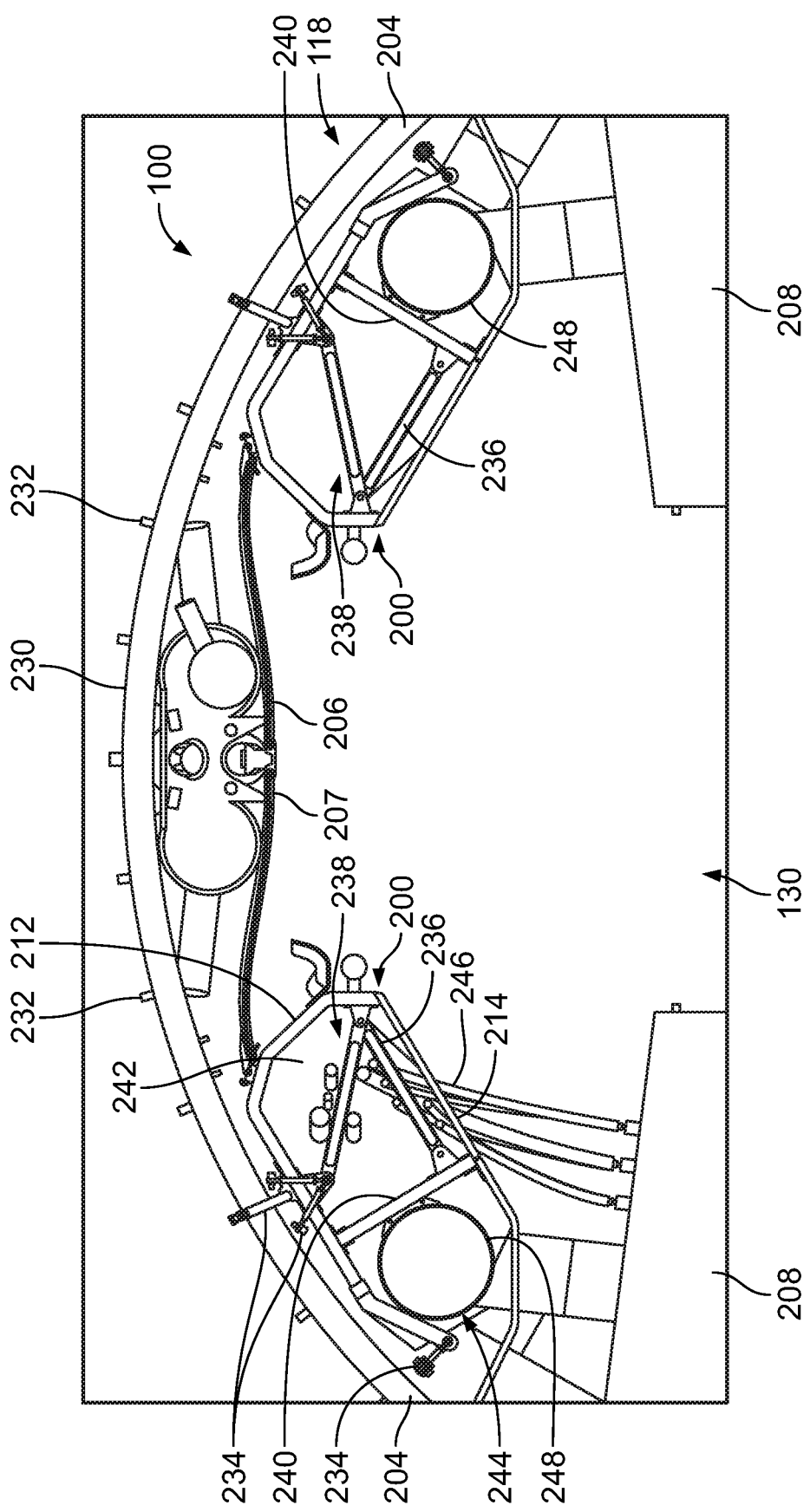
FIG. 3 illustrates an end view of the raceway system within the internal cabin.

FIG. 3 illustrates an end view of the raceway system 200 within the internal cabin 130. In at least one embodiment, the internal cabin 130 is formed by a plurality of annular frames 230 and a plurality of stringers 232 that extend along a length of the internal cabin 130. For clarity, external portions of the fuselage 118 are not shown in FIG. 3. The ceiling 206 may include a liner 207 that extends between upper portions of the main housings 212 of the routing modules 210.

Each routing module 210 may have an axial cross-section that is the same size or similar to a stowage bin that may be positioned within a commercial aircraft (but may not be within the military commercial derived aircraft 100). Further, the overall size of each routing module 210 may be the same or similar to that of a stowage bin. In this manner, the routing modules 210 may be quickly and efficiently secured to portions of the aircraft 100, such as the frames 230 and the stringers 232, using mounting supports 234 that would otherwise be used to securely mount stowage bins within the internal cabin 130. In at least one embodiment, the main housings 212 of the routing modules 210 are secured to the frames 230 and the stringers 232 with the mounting supports 234 (such as existing commercial aircraft mounting supports, for example), such as may include support tie rods, which would otherwise be used to secure a stowage bin to a frame or stringer. The raceway systems 200 may occupy existing overhead stowage bin space within the aircraft 100 (which would otherwise be occupied by stowage bins) to route various transferring components, such as wiring and air ducts.

The routing modules 210 are not stowage bins. Indeed, a stowage bin having an exposed bottom opening would not be capable of retaining carry-on bags. Further, stowage bins have fore and aft walls that would prevent transfer components from extending along a length of an aircraft between different systems, structures, and the like.

As shown, the routing modules 210 may include open fore and aft ends 236. Accordingly, when adjacent routing modules 210 are connected together in an end-to-end fashion, a routing channel 238 is defined therebetween.

In at least one embodiment, the routing modules 210 include longitudinal separating walls 240 that separate internal volumes into a first space 242 and a second space 244. The separated spaces 242 and 244 allow for different transferring components to be separated or segregated from one another. For example, first transferring components 246 (such as electrical wiring) may extend through the first space 242, while second transferring components 248 (such as an air duct) may extend through the second space 244. The transferring components 246 may pass out of the bottom opening 214 to couple to a monument 208, such as a mission system or sub-system. In at least one embodiment, a door 216 includes openings that allow the first transferring components 246 to extend through the door 216 in the closed position.

As noted, the raceway system 200 routes the first transferring components 246 and the second transferring components 248 along a length of the internal cabin 130 to various locations (such as to various monuments 208). The raceway systems 200 are outside of the sidewalls 204 and the ceiling 206, above the monuments 208, thereby allowing for easy access to the first transferring components 246 and the second transferring components 248 (in contrast to if the transferring components were within the sidewalls 204, which would typically require the monuments 208 to be moved and portions of the sidewalls 204 to be removed in order to gain access to the transferring components).

Figure 4:
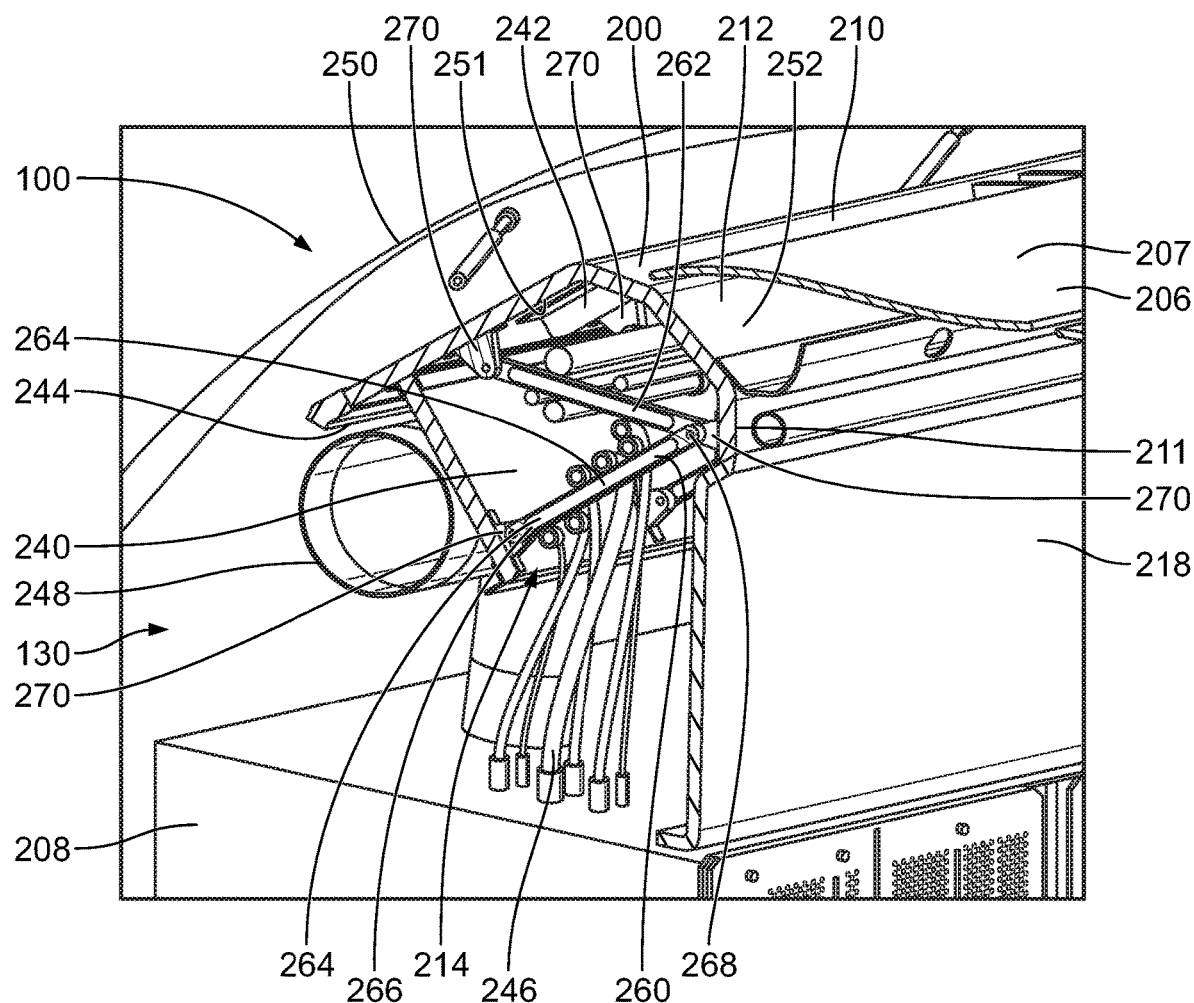
FIG. 4 illustrates a perspective end view of the raceway system within the internal cabin.

FIG. 4 illustrates a perspective end view of the raceway system 200 within the internal cabin 130. The separating wall 240 separates the first space 242 from the second space 244. Each routing module 210 may be as long as a typical stowage bin. In at least one other embodiment, each routing module 210 may be longer or shorter than a typical stowage bin. In at least one embodiment, the raceway system 200 may include a single routing module 210 that extends along a length of the internal cabin 130.

As an option, a fixed panel 218 extends downwardly from a front lower edge 211 of the main housing 212 to a top of a monument 208. In this manner, the fixed panel 218 provides a closeout that hides and protects the first transferring components 246 (for example, electrical wiring or cables) that extend downwardly through the bottom opening 214 and to the monument 208. The fixed panel 218 may be secured to the front lower edge 211 and the monument 208 through fasteners.

The routing modules 210 includes a top wall 250 that connects to a front wall 252, which may include outwardly angled segments. The separating wall 240 extends downwardly from an internal surface 251 of the top wall 250 towards the bottom opening 214. The separating wall 240 may be perpendicular to the top wall 250. In at least one embodiment, the routing modules 210 may include one or more additional separating walls to provide additional segregated spaces.

First transferring component support struts 260 extend between the separating wall 240 and the front wall 252. Second transferring component support struts 262 may extend between the top wall 250 and the front wall 252. Each transferring component support strut 260 and 262 includes a main beam 264 having ends 266 and 268 that couple to securing lugs 270 secured to interior surfaces of the main housing 212. For example, the ends 266 and 268 securely connect to the securing lugs 270 through fasteners, such as pins, bolts, screws, clips, or the like. The transferring component struts 260 and 262 provide support ledges for the transferring components within the routing modules 210. For example, the transferring components are secured to the struts 260 and/or 262, such as via clips. The transferring components extend between the struts 260 and/or 262. Additionally, the transferring component support struts 260 and 262 provide bracing supports within the routing modules 210. Optionally, the routing modules 210 may include more or less support struts than shown. For example, the routing modules 210 may include the support struts 260, but not the support struts 262, or vice versa.

In at least one embodiment, the support struts 260 and 262 are configured to support transferring components (such as wiring) on top and bottom surfaces. The transferring components may be secured to top and bottom surfaces of the support struts 260 and 262 through reciprocal channels, adhesives, fasteners (such as pins and ties), and/or the like.

Figure 5:
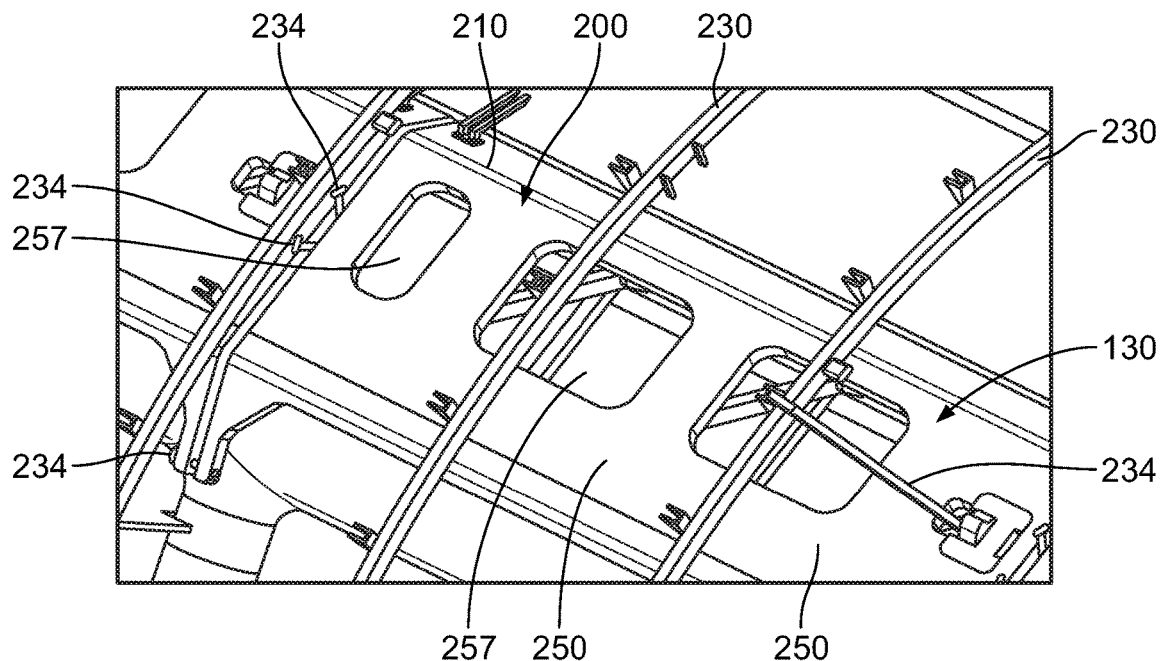
FIG. 5 illustrates a perspective top view of the raceway system within the internal cabin.
Figure 6:
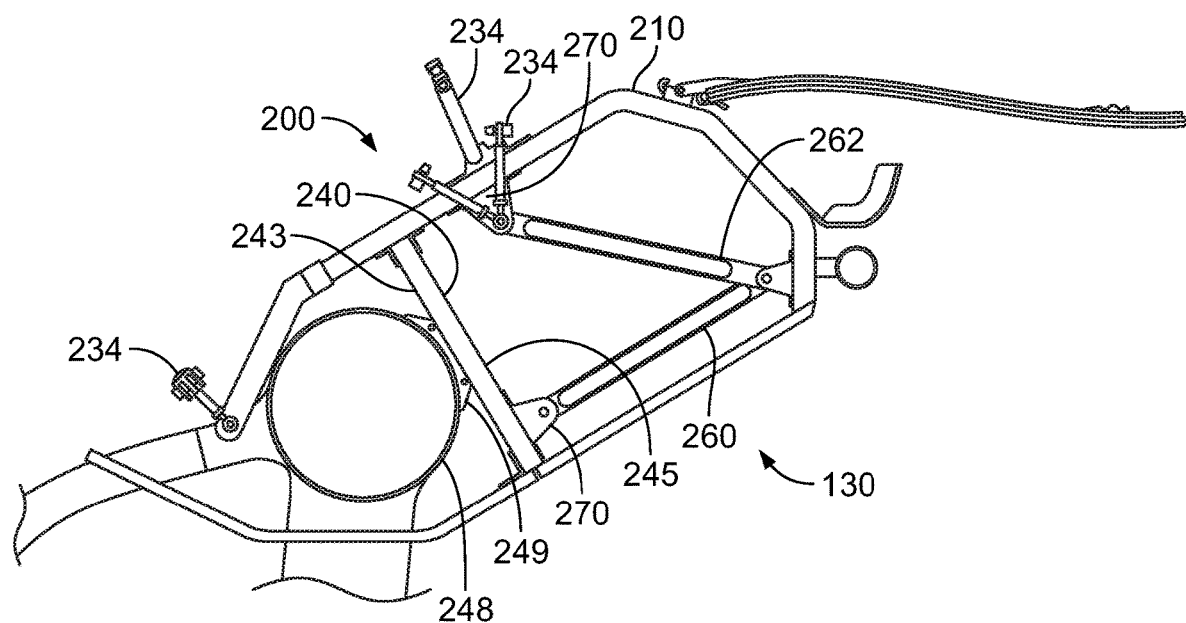
FIG. 6 illustrates an end view of the raceway system.

FIG. 5 illustrates a perspective top view of the raceway system 200 within the internal cabin 130. FIG. 6 illustrates an end view of the raceway system 200. Referring to FIGS. 5 and 6, the routing modules 210 are secured to the frames 230 and/or the stringers 232 (shown in FIG. 3) through the mounting supports 234. The mounting supports 234 may include tie rods, brackets, fasteners, and/or the like that are typically used to mount stowage bins to the frames 230 and/or the stringers 232. As such, in at least one embodiment, the mounting supports 234 are stowage bin mounting supports 234 that secure the raceway system 200 to the frames 230 and/or the stringers 232. The mounting supports 234 may secure to the frames 230 and/or stringers 232 and lugs 270 of the routing modules 210 to secure the raceway system 200 within the internal cabin 130.

As shown in FIG. 6, the second transferring component 248 (such as a duct) is securely mounted to the separating wall 240 via a bracket 249. The bracket 249 extends from an outer surface 243 of the separating wall 240 that is opposite from the internal surface 245 on which a lug 270 is secured.

In at least one embodiment, the top walls 250 include top openings 257 (as shown in FIG. 5). The top openings 257 allow for transferring components (such as electrical wiring) to pass from internal portions of the routing modules 210 to an upper portion of the internal cabin 130. For example, the routing modules 210 may route electrical wiring or cabling to an antenna positioned above the raceway system 200. Optionally, at least some of the routing modules 210 may not include the top openings 257.

Figure 7:
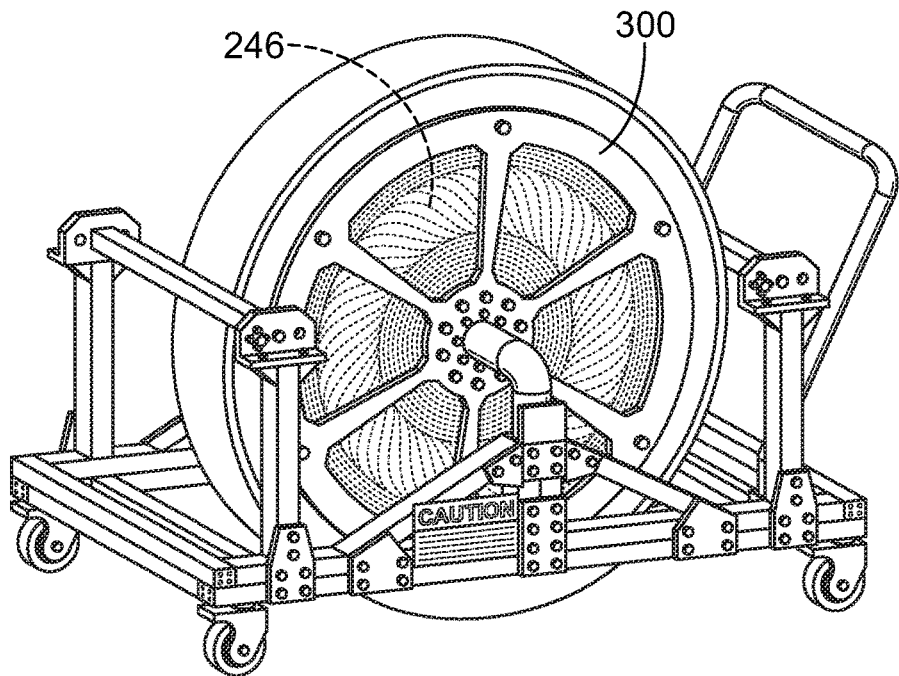
FIG. 7 illustrates a perspective front view of a drum reel having first transferring components wound therearound, according to an embodiment of the present disclosure.

FIG. 7 illustrates a perspective front view of a drum reel 300 having the first transferring components 246 (such as electrical wiring) wound therearound, according to an embodiment of the present disclosure. Referring to FIGS. 4, 6, and 7, in at least one embodiment, the support struts 260 and 262 are secured to the first transferring components 246 (such as electrical wiring) prior to assembly within the routing modules 210. In this manner, the first transferring components 246 are initially coupled to the support struts 260 and 262 and wound onto the drum reel 300. During an assembly process, the first transferring components 246 and the support struts 260 and/or 262 secured thereto are unrolled off of the drum reel 300. The unrolled first transferring components 246 are then efficiently secured within the routing modules 210 by simply securing the support struts 260 and/or 262 to the securing lugs 270, which provides an assembly process that is far more efficient than individually securing the first transferring components 246 to frames 230 and/or stringers 232 with numerous individual fasteners.

Figure 8:
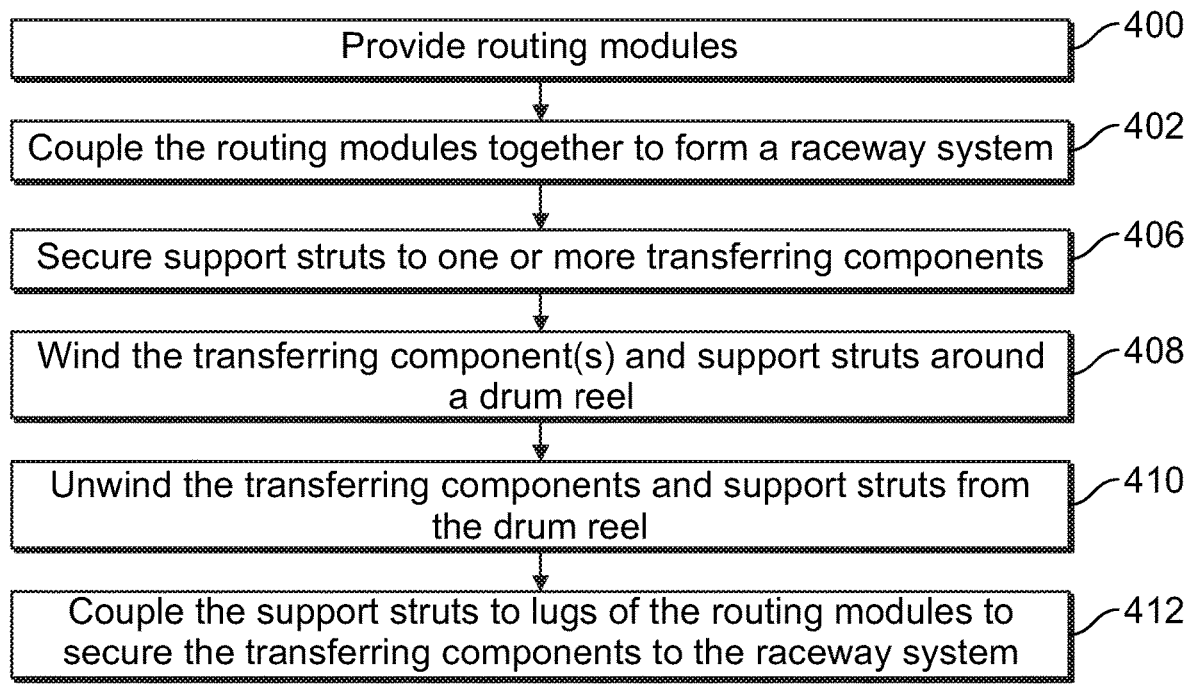
FIG. 8 illustrates a flow chart of a method of securing transferring components within the internal cabin of the aircraft, according to an embodiment of the present disclosure.

FIG. 8 illustrates a flow chart of a method of securing transferring components (such as electrical wiring or cables) within the internal cabin of the aircraft, according to an embodiment of the present disclosure. Referring to FIGS. 1-8, at 400, routing modules 210 are provided. Each routing module 210 may be sized and shaped the same. The routing modules 210 are configured to modularly connect together to form a raceway system 200 of a desired length.

At 402, the routing modules 210 are coupled together to form the raceway system 200. At 406, the support struts 260 (or 262) are secured to the transferring components (such as the first transferring components 246), such as through clips, ties, or the like. In at least one embodiment, at 408, the transferring components and the coupled support struts are wound onto and around the drum reel 300. For example, a supplier may wind the transferring components and support struts onto the drum reel 300. The drum reel 300 is delivered to a customer, such as an aircraft manufacturer. At 410, the customer unwinds the transferring components and coupled support struts from the drum reel 300. Steps 406-410 may occur before, after or concurrently with one or more of steps 400-402. At 412, the support struts are coupled to the lugs 270 of the routing modules 210 (such as via fasteners), thereby securing the transferring components to the raceway system 200. In at least one embodiment, the method may not include 408-410. In at least one embodiment, subsequent to or during 412, the method may also include securing he raceway system 200 to existing mounting structures (such as the mounting supports 234) within the internal cabin 130.

Figure 9:
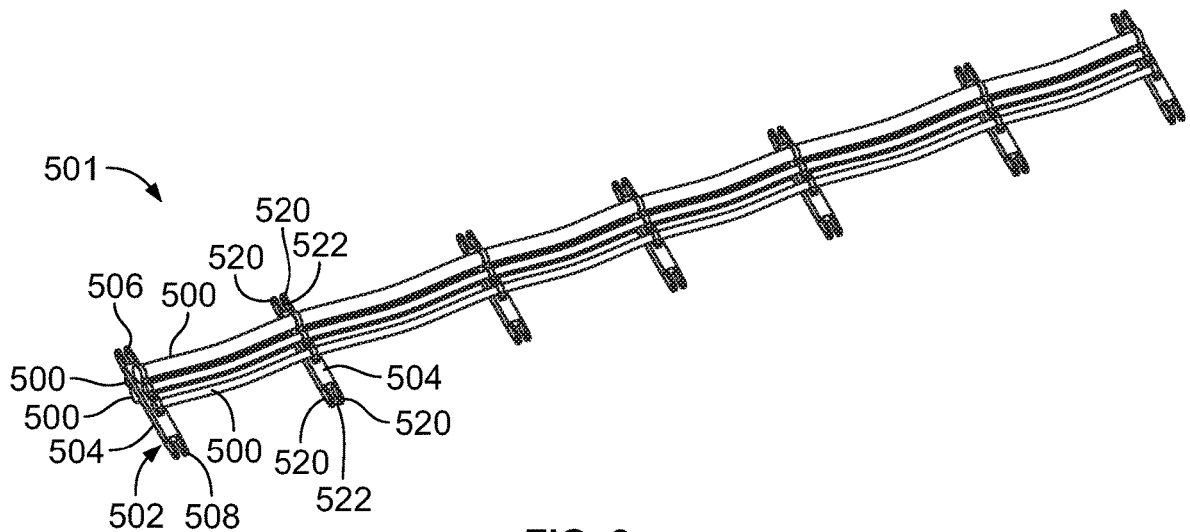
FIG. 9 illustrates a perspective top view of a plurality of transferring components coupled to a plurality transferring component support struts, according to an embodiment of the present disclosure.
Figure 10:
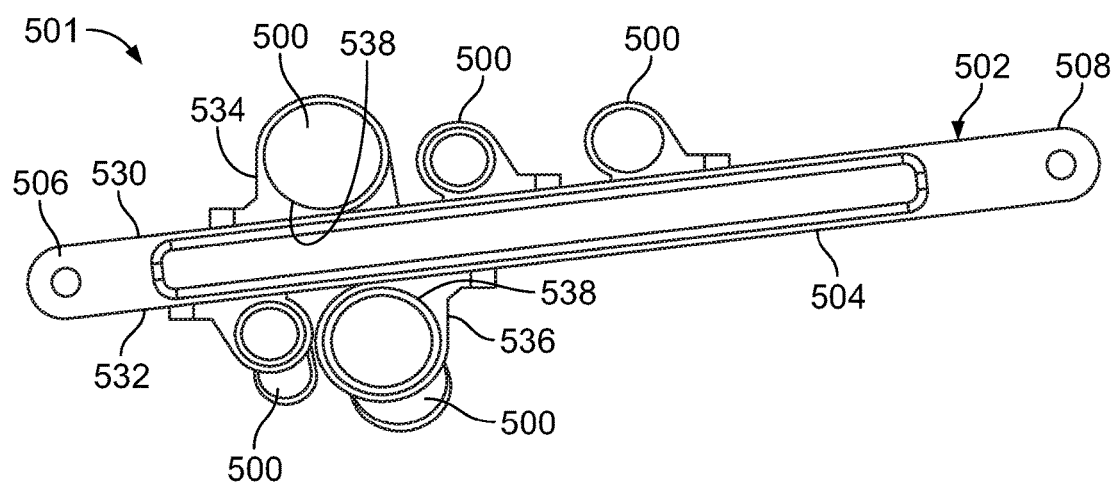
FIG. 10 illustrates a perspective end view of the plurality of transferring components coupled to a transferring component support strut, according to an embodiment of the present disclosure.

FIG. 9 illustrates a perspective top view of a plurality of transferring components 500 coupled to a plurality transferring component support struts 502, according to an embodiment of the present disclosure. FIG. 10 illustrates a perspective end view of the plurality of transferring components 500 coupled to a transferring component support strut 502, according to an embodiment of the present disclosure. The transferring components 500 coupled to the transferring component support struts 502 form a transferring component attachment system 501.

Each transferring component support strut 502 includes a main beam 504 having ends 506 and 508 that are configured to couple to securing lugs (such as the securing lugs 270 shown in FIG. 4) that are secured to interior surfaces of a main housing (such as the main housing 212 shown in FIG. 4). For example, the ends 506 and 508 include prongs 520 separated by a space 522. At least a portion of a securing lug may be positioned within the space 522, and secured to the prongs 520 via fasteners, such as pins, bolts, screws, clips, or the like. The transferring components 500 may be secured to top surfaces 530 and bottom surfaces 532 of the transferring component support struts 502 through fasteners, adhesives, and/or the like to form the transferring component attachment system 501. For example, one or more securing clips 534 may be secured to a top surface 530 of the main beam 504, and one or more securing clips 536 may be secured to the bottom surface 532 of the main beam 504. The clips 534 and 536 may be integrally formed with the main beam 504, or may be secured thereto with fasteners, adhesives, and/or the like. Each securing clip 534 and 536 may be include a channel 538 that is sized and shaped to conform to a portion of an outer surface of a transferring component 500. As such, the securing clips 534 and 536 may receive and securely retain portions of the transferring components 500 through an interference fit, a clamping fit, and/or the like. In at least one embodiment, the transferring components 500 may be secured to the transferring component support struts 502 through adhesives, ties, and/or the like. The transferring component struts 502 provide support surfaces (whether on top or below) for the transferring components within routing modules (such as the routing modules 210, shown in FIG. 4). For example, referring to FIGS. 4, 9, and 10, the transferring components 500 are secured to the support struts 502, such as via the securing clips 534 and 536. The transferring components 500 extend along (such as over and/or under) adjacent support struts 302. In at least one embodiment, the support struts 302 may include interior channels that allow the transferring components 500 to pass through the main beams 504. Additionally, the transferring component support struts 502 provide bracing supports within the routing modules 510.

As noted, the support struts 502 are configured to support transferring components (such as wiring) on the top surfaces 530 and the bottom surfaces 542 to form the transferring component attachment system 501. Alternatively, the support struts 502 may be configured to support transferring components on only the top surfaces 530 or only the bottom surfaces 502. In at least one other embodiment, the support struts 502 are configured to support transferring components through channels formed through the main beams 504. As such, the support struts 502 may be configured to support transferring components on top surfaces 530, bottom surfaces 502, and/or through main beams 504 (such as through channels or passages formed through the main beams) 504).

Referring to FIGS. 4, 7, 9, and 10, the support struts 502 are secured to the transferring components 500 (such as electrical wiring) to form the transferring component attachment system 501 prior to assembly within the routing modules 210. In this manner, the transferring components 500 are initially coupled to the support struts 502 to form the transferring component attachment system 501, which is wound onto the drum reel 300. Optionally, the transferring component attachment system 501 is not wound onto a drum reel. During an assembly process, the transferring component attachment system 501 including the transferring components 500 (such as the first transferring components 246) and the support struts 502 secured thereto, is unrolled off of the drum reel 300. The unrolled transferring component attachment system 501 including the transferring components 500 is then efficiently secured within the routing modules 210 by simply securing the support struts 502 to the securing lugs 270, which provides an assembly process that is far more efficient than individually securing the transferring components 500 to frames 230 and/or stringers 232 (shown in FIG. 3, for example) with numerous individual fasteners.

In at least one embodiment, the support struts 502 are secured to the transferring components 500, such as through clips, ties, or the like, to form the transferring component attachment system 501. The transferring component attachment system 501 is wound onto and around the drum reel 300. For example, a supplier may wind the transferring component attachment system 501 onto the drum reel 300. The drum reel 300 is delivered to a customer, such as an aircraft manufacturer. The customer unwinds the transferring component attachment system 501 from the drum reel 300.

Figure 11:
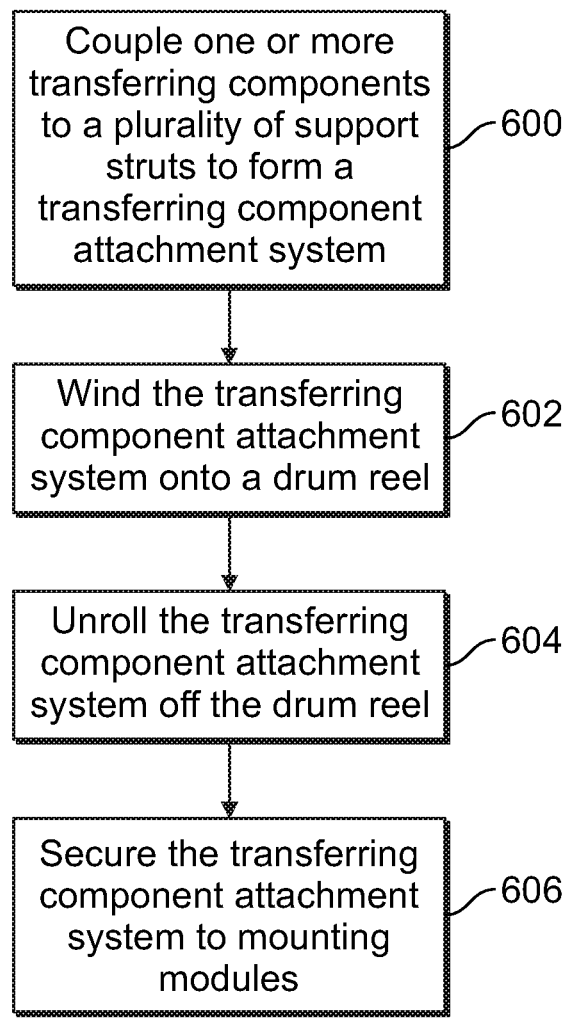
FIG. 11 illustrates a flow chart of a method of securing transferring components within the internal cabin of the aircraft, according to an embodiment of the present disclosure.

FIG. 11 illustrates a flow chart of a method of securing transferring components within the internal cabin of the aircraft, according to an embodiment of the present disclosure. At 600, one or more transferring components are coupled to a plurality of support struts to form a transferring component attachment system. At 602, the transferring component attachment system is wound onto a drum reel. At 604, the transferring component attachment system is unrolled off of the drum reel. Optionally, the method may not include 602 and 604. At 606, the transferring component attachment system is secured to routing modules.

As described herein, embodiments of the present disclosure provide raceway systems 200 that are secured to existing structural attachment locations within the internal cabin 130. In at least one embodiment, the existing structural attachment locations are those that would secure stowage bin assemblies inside an internal cabin of a commercial aircraft. The raceway systems 200 include routing modules 210 into which the transferring components are secured, instead of securing the transferring components directly to brackets, frames, stringers, and/or the like. As such, the manufacturing process is vastly improved in that it is less time- and labor-intensive (both in terms of a factory shop perspective, as well as an engineering definition) as compared to prior known manufacturing processes for military commercial derived aircraft. The raceway systems 200 provide quick and easy access to wiring and ducting during installation, as well as for inspection and maintenance, and future modifications and upgrades.

Embodiments of the present disclosure provide systems and methods for efficiently mounting transferring components (such as electrical wiring, ducting, liquid conduits, and/or the like) within an internal cabin of an aircraft, such as a military commercial derivative aircraft. Further, embodiments of the present disclosure provide systems and methods that reduce the time, effort, and cost of designing and securing transferring components within an internal cabin of an aircraft, and reduce a total manufacturing time. Further, embodiments of the present disclosure provide systems and methods that allow for easy and cost-efficient inspection of installed wiring within an aircraft.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

The invention claimed is:

1. A raceway system within an aircraft, the raceway system comprising:
a plurality of routing modules that are coupled together, wherein each of the plurality of routing modules includes a main housing that routes one or more transferring components to one or more monuments within the aircraft,
wherein the main housing comprises a bottom opening, wherein portions of the one or more transferring components extend through the bottom opening to couple to the one or more monuments, and
wherein at least one of the plurality of modules comprises a door that is pivotally coupled to the main housing proximate to the bottom opening, wherein the door is configured to be selectively moved between an open position and a closed position.

2. The raceway system of claim 1, further comprising at least one fixed panel that extends between at least one of the plurality of modules and the one or more monuments.

3. The raceway system of claim 1, wherein the plurality of routing modules are outside of a sidewall and ceiling of an internal cabin of the aircraft.

4. The raceway system of claim 1, wherein at least one of the plurality of routing modules is positioned above the one or more monuments.

5. The raceway system of claim 1, wherein each of the plurality of routing modules is secured to one or both of at least one frame or at least one stringer by one or more stowage bin mounting supports.

6. The raceway system of claim 1, wherein one or more of the plurality of routing modules comprises a longitudinal separating wall that defines a first space and a second space, wherein the first space and the second space allow different transferring components to be separated from one another.

7. The raceway system of claim 1, wherein each of the plurality of routing modules comprises one or more transferring component support struts that secure the one or more transferring components within the main housing.

8. The raceway system of claim 7, wherein the one or more transferring component struts are secured to one or more lugs within the main housing through one or more fasteners.

9. The raceway system of claim 7, wherein the one or more transferring components are secured to the one or more transferring component support struts before being secured within the main housing.

10. The raceway system of claim 1, wherein at least one of the plurality of routing modules comprises a top opening formed through a top wall.

11. A raceway method for an aircraft, the raceway method comprising:
providing a plurality of routing modules;
coupling the plurality of routing modules together within the aircraft;
routing one or more transferring components to one or more monuments within the aircraft through main housings of the plurality of routing modules;
extending portions of the one or more transferring components through bottom openings of the main housings;
pivotally coupling at least one door of at least one of the plurality of modules to at least one of the main housings proximate to at least one of the bottom openings, wherein the at least one door is configured to be selectively moved between an open position and a closed position.

12. The raceway method of claim 11, further comprising: disposing the plurality of routing modules outside of a sidewall and ceiling of an internal cabin of the aircraft.

13. The raceway method of claim 11, further comprising positioning at least one of the plurality of routing modules above the one or more monuments.

14. The raceway method of claim 11, further comprising securing each of the plurality of routing modules to one or both of at least one frame or at least one stringer with one or more stowage bin mounting supports.

15. The raceway method of claim 11, wherein the providing comprises providing one or more of the plurality of routing modules with a longitudinal separating wall that defines a first space and a second space, wherein the first space and the second space allow different transferring components to be separated from one another.

16. The raceway method of claim 11, further comprising:
securing the one or more transferring components to one or more transferring component struts; and
securing the one or more transferring component struts that are coupled to the one or more transferring components to one or more lugs within the main housings.

17. The raceway method of claim 11, wherein the providing comprises forming a top opening through a top wall of at least one of the plurality of routing modules.

18. An aircraft comprising:
a fuselage defining an internal cabin, wherein the fuselage includes a plurality of frames and a plurality of stringers connected to the plurality of frames;
one or more monuments within the internal cabin; and
a raceway system within the internal cabin, the raceway system comprising a plurality of routing modules that are coupled together,
wherein each of the plurality of routing modules includes a main housing that routes one or more transferring components to the one or more monuments within the internal cabin,
wherein the main housing comprises a bottom opening, wherein portions of the one or more transferring components extend through the bottom opening to couple to the one or more monuments,
wherein at least one of the plurality of modules comprises a door that is pivotally coupled to the main housing proximate to the bottom opening, wherein the door is configured to be selectively moved between an open position and a closed position,
wherein at least one of the plurality of routing modules comprises a top opening formed through a top wall,
wherein at least one of the plurality of routing modules is positioned above the one or more monuments,
wherein the plurality of routing modules are outside of a sidewall and ceiling of the internal cabin,
wherein each of the plurality of routing modules is secured to at least one of the frames or the stringers by one or more stowage bin mounting supports,
wherein one or more of the plurality of routing modules comprises a longitudinal separating wall that defines a first space and a second space, wherein the first space and the second space allow different transferring components to be separated from one another,
wherein each of the plurality of routing modules comprises one or more transferring component support struts that secure the one or more transferring components within the main housing,
wherein the one or more transferring components are secured to the one or more transferring component support struts before being secured within the main housing, and wherein the one or more transferring component struts are secured to one or more lugs within the main housing through one or more fasteners.

19. The raceway system of claim 1, wherein the door comprises one or more door openings that allow at least a portion of the one or more transferring components to extend through the door in the closed position.

20. The aircraft of claim 18, wherein the door comprises one or more door openings that allow at least a portion of the one or more transferring components to extend through the door in the closed position.

* * * * *